United States Patent
Soua et al.

(10) Patent No.: US 11,549,894 B2
(45) Date of Patent: Jan. 10, 2023

(54) DETERMINATION OF DEPOSITIONAL ENVIRONMENTS

(71) Applicant: Saudi Arabian Oil Company, Dhahran (SA)

(72) Inventors: Mohamed Soua, Dhahran (SA); David Jacobi, Spring, TX (US); Jose Antonio Estevez Gonzalez, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 268 days.

(21) Appl. No.: 16/840,892

(22) Filed: Apr. 6, 2020

(65) Prior Publication Data
US 2021/0310966 A1    Oct. 7, 2021

(51) Int. Cl.
G01N 23/20    (2018.01)
E21B 49/00    (2006.01)
G01V 1/40    (2006.01)

(52) U.S. Cl.
CPC ............. *G01N 23/20* (2013.01); *E21B 49/00* (2013.01); *G01V 1/40* (2013.01)

(58) Field of Classification Search
CPC .. G01N 23/20; G01N 23/207; G01N 23/2055; G01N 2223/616; E21B 49/00; E21B 41/00; G01V 1/40
See application file for complete search history.

(56) References Cited

U.S. PATENT DOCUMENTS

| | | | |
|---|---|---|---|
| 2,900,269 A | 8/1959 | Bauman et al. | |
| 3,284,281 A | 11/1966 | Thomas | |
| 3,716,387 A | 2/1973 | Simmons et al. | |
| 3,807,557 A | 4/1974 | Miller | |
| 3,926,575 A | 12/1975 | Meyers | |
| 3,996,062 A | 12/1976 | Frost | |
| 4,043,885 A | 8/1977 | Yen et al. | |
| 4,220,550 A | 9/1980 | Frenier et al. | |
| 4,223,726 A | 9/1980 | Cha | |
| 4,252,189 A | 2/1981 | Bodine | |
| 4,289,639 A | 9/1981 | Buske | |

(Continued)

FOREIGN PATENT DOCUMENTS

| CN | 101819111 | 12/2011 |
|---|---|---|
| CN | 1621803 | 5/2012 |

(Continued)

OTHER PUBLICATIONS

Abad et al., "Evaluation of the Material Properties of the Multilayered Oxides formed on HCM12A using New and Novel Techniques," Manuscript Draft, Manuscript No. OXID-D-15-00019, 2015, 44 pages.

(Continued)

*Primary Examiner* — Manuel A Rivera Vargas
*Assistant Examiner* — Yaritza H Perez Bermudez
(74) *Attorney, Agent, or Firm* — Fish & Richardson P.C.

(57) ABSTRACT

Methods are provided for determining a depositional environment of a sample of a subterranean environment. An example method includes measuring intensities for a crystallographic plane (CP) 100 peak and a CP 101 peak for quartz in a diffractogram, calculating a ratio of the intensities of the CP 100 peak to the CP 101 peak, and identifying a depositional environment for the sample from the ratio.

20 Claims, 8 Drawing Sheets

(56) References Cited

U.S. PATENT DOCUMENTS

| | | | |
|---|---|---|---|
| 4,324,560 A | 4/1982 | Fonseca | |
| 4,381,950 A | 5/1983 | Lawson | |
| 4,444,058 A | 4/1984 | Ratigan | |
| 4,587,739 A | 5/1986 | Holcomb | |
| 4,594,170 A | 6/1986 | Brown et al. | |
| 4,640,692 A | 2/1987 | Audeh | |
| 5,193,396 A | 3/1993 | Gorski | |
| 5,302,297 A | 4/1994 | Barthrope | |
| 5,435,187 A | 7/1995 | Ewy | |
| 5,757,473 A | 5/1998 | Kanduth et al. | |
| 5,759,964 A | 6/1998 | Shuchart | |
| 5,869,750 A | 2/1999 | Onan | |
| 5,999,887 A | 12/1999 | Giannakopoulos et al. | |
| 6,095,679 A | 8/2000 | Hammiche et al. | |
| 6,138,760 A | 10/2000 | Lopez et al. | |
| 6,411,902 B1 | 6/2002 | Wiltshire | |
| 6,488,091 B1 | 12/2002 | Weaver | |
| 6,491,425 B1 | 12/2002 | Hammiche et al. | |
| 6,494,263 B2 | 12/2002 | Todd | |
| 6,516,080 B1 | 2/2003 | Nur | |
| 6,749,022 B1 | 6/2004 | Fredd | |
| 6,866,048 B2 | 3/2005 | Mattox | |
| 6,947,843 B2 | 9/2005 | Fisher et al. | |
| 6,989,391 B2 | 1/2006 | Funkhouser | |
| 7,086,484 B2 | 8/2006 | Smith | |
| 7,098,663 B1 | 8/2006 | Bader | |
| 7,344,889 B2 | 3/2008 | Kelemen et al. | |
| 7,369,980 B2 | 5/2008 | Deffenbaugh et al. | |
| 7,526,418 B2 | 4/2009 | Pita et al. | |
| 7,565,831 B2 | 7/2009 | Miyahara | |
| 7,974,380 B2 * | 7/2011 | Fowler | G01N 23/20025 378/208 |
| 7,983,845 B2 | 7/2011 | Minh | |
| 8,165,817 B2 | 4/2012 | Betancourt et al. | |
| 8,177,422 B2 | 5/2012 | Kjoller et al. | |
| 8,225,866 B2 | 7/2012 | Rouffignac et al. | |
| 8,278,931 B2 | 10/2012 | Fang et al. | |
| 8,352,228 B2 | 1/2013 | Walters et al. | |
| 8,380,437 B2 | 2/2013 | Abousleiman et al. | |
| 8,473,213 B2 | 6/2013 | Zhu et al. | |
| 8,701,788 B2 | 4/2014 | Wigand et al. | |
| 8,729,903 B2 | 5/2014 | Srnka et al. | |
| 8,839,860 B2 | 9/2014 | Wigand et al. | |
| 8,851,177 B2 | 10/2014 | Wigand | |
| 8,865,482 B2 | 10/2014 | Wang et al. | |
| 8,868,385 B2 | 10/2014 | Fertig et al. | |
| 8,936,089 B2 | 1/2015 | Wigand | |
| 9,057,797 B2 | 6/2015 | Omeragic et al. | |
| 9,128,210 B2 | 9/2015 | Pomerantz | |
| 9,152,745 B2 | 10/2015 | Glinsky | |
| 9,696,270 B1 | 7/2017 | Roy et al. | |
| 9,784,882 B2 | 10/2017 | Vinegar et al. | |
| 9,834,721 B2 | 12/2017 | Chang et al. | |
| 9,863,231 B2 | 1/2018 | Hull et al. | |
| 9,869,649 B2 | 1/2018 | Hull et al. | |
| 10,329,478 B2 | 6/2019 | Schnoor et al. | |
| 2005/0060130 A1 | 3/2005 | Shapiro et al. | |
| 2005/0103118 A1 | 5/2005 | Workman | |
| 2006/0047489 A1 | 3/2006 | Scheidt et al. | |
| 2006/0092766 A1 | 5/2006 | Shelley et al. | |
| 2006/0265204 A1 | 11/2006 | Wallis et al. | |
| 2007/0203677 A1 | 8/2007 | Awwiller | |
| 2007/0246649 A1 * | 10/2007 | Jacobi | G01V 5/12 250/269.6 |
| 2007/0298979 A1 | 12/2007 | Perry et al. | |
| 2008/0006410 A1 | 1/2008 | Looney et al. | |
| 2008/0059140 A1 | 3/2008 | Salmon et al. | |
| 2008/0070806 A1 | 3/2008 | Lin et al. | |
| 2009/0071239 A1 | 3/2009 | Rojas et al. | |
| 2009/0087912 A1 | 4/2009 | Ramos et al. | |
| 2009/0143252 A1 | 6/2009 | Lehmann | |
| 2009/0193881 A1 | 8/2009 | Finnberg | |
| 2009/0248309 A1 | 10/2009 | Nelville et al. | |
| 2009/0313772 A1 | 12/2009 | Talley | |
| 2010/0010106 A1 | 1/2010 | Crews | |
| 2010/0049625 A1 | 2/2010 | Biebesheimer et al. | |
| 2010/0051511 A1 | 3/2010 | Faerman | |
| 2010/0186520 A1 | 7/2010 | Wheeler | |
| 2010/0213579 A1 | 8/2010 | Henry | |
| 2010/0224365 A1 | 9/2010 | Abad | |
| 2010/0258265 A1 | 10/2010 | Karanikas et al. | |
| 2010/0276142 A1 | 11/2010 | Skildum et al. | |
| 2010/0279136 A1 | 11/2010 | Bonucci | |
| 2011/0065612 A1 | 3/2011 | Stokes et al. | |
| 2011/0257944 A1 | 10/2011 | Du et al. | |
| 2011/0259588 A1 | 10/2011 | Ali et al. | |
| 2012/0026037 A1 | 2/2012 | Thomson et al. | |
| 2012/0179444 A1 | 7/2012 | Ganguly et al. | |
| 2012/0193578 A1 | 8/2012 | Pan et al. | |
| 2012/0247774 A1 | 10/2012 | Li et al. | |
| 2012/0261617 A1 | 10/2012 | Pan et al. | |
| 2013/0013209 A1 | 1/2013 | Zhu et al. | |
| 2013/0056213 A1 | 3/2013 | Medvedev et al. | |
| 2013/0068449 A1 * | 3/2013 | Pillai | C21D 9/00 420/104 |
| 2013/0084643 A1 | 4/2013 | Commarieu et al. | |
| 2013/0160994 A1 | 6/2013 | Alsop et al. | |
| 2013/0161002 A1 | 6/2013 | Wigand | |
| 2013/0213120 A1 | 8/2013 | Lebedev | |
| 2013/0228019 A1 | 9/2013 | Meadows | |
| 2013/0231908 A1 | 9/2013 | Williams et al. | |
| 2013/0233536 A1 | 9/2013 | Alqam | |
| 2013/0238304 A1 | 9/2013 | Glinsky | |
| 2013/0269933 A1 | 10/2013 | Pomerantz et al. | |
| 2014/0008305 A1 | 1/2014 | Nichols et al. | |
| 2014/0045732 A1 | 2/2014 | Mazyar | |
| 2014/0048694 A1 | 2/2014 | Pomerantz | |
| 2014/0067351 A1 | 3/2014 | Gray et al. | |
| 2014/0116710 A1 | 5/2014 | Naser-El-Din et al. | |
| 2014/0231077 A1 | 8/2014 | Rivero et al. | |
| 2014/0251605 A1 | 9/2014 | Hera | |
| 2014/0260694 A1 | 9/2014 | Szlendak | |
| 2014/0374104 A1 | 12/2014 | Kushal | |
| 2015/0019183 A1 | 1/2015 | Suzuki | |
| 2015/0075782 A1 | 3/2015 | Sharma | |
| 2015/0152724 A1 | 6/2015 | Amendt | |
| 2015/0293256 A1 | 10/2015 | Dusterhoft | |
| 2016/0103047 A1 | 4/2016 | Liu | |
| 2016/0103049 A1 | 4/2016 | Liu | |
| 2016/0265331 A1 | 9/2016 | Weng et al. | |
| 2016/0290938 A1 * | 10/2016 | Bruzenak | G01N 23/2005 |
| 2016/0362965 A1 | 12/2016 | Parlar | |
| 2017/0066959 A1 | 3/2017 | Hull | |
| 2017/0067836 A1 | 3/2017 | Hull et al. | |
| 2017/0336528 A1 | 11/2017 | Badri et al. | |
| 2017/0370197 A1 | 12/2017 | Han et al. | |
| 2018/0112126 A1 * | 4/2018 | Yang | C09K 8/58 |

FOREIGN PATENT DOCUMENTS

| | | |
|---|---|---|
| CN | 102183410 | 5/2014 |
| CN | 105445440 | 3/2016 |
| EP | 247669 | 12/1987 |
| EP | 2480625 | 4/2013 |
| EP | 2480626 | 4/2013 |
| WO | WO 1997028098 | 8/1997 |
| WO | WO 2002064702 | 8/2002 |
| WO | WO 2004005435 | 1/2004 |
| WO | WO 2008001218 | 1/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012087887 | 6/2012 |
| WO | WO 2012171857 | 12/2012 |
| WO | WO 2013149122 | 10/2013 |
| WO | WO 2015097116 | 7/2015 |
| WO | WO 2015181028 | 12/2015 |
| WO | WO 2015200060 | 12/2015 |
| WO | WO 2016205894 | 12/2016 |

(56) References Cited

FOREIGN PATENT DOCUMENTS

WO     WO-2016205894 A1 * 12/2016
WO     WO 2017136641     8/2017

OTHER PUBLICATIONS

Abousleiman et al, "A Micromechanically Consistent Poroviscoelasticity Theory for Rock Mechanics Applications," Int. J. Rock Mech. Min. Sci. & Geomech. Abstr., 30:7, 1993, 4 pages.
Abousleiman et al, "Anisotropic Porothermoelastic Solution and Hydro-Thermal Effects on Fracture Width in Hydraulic Fracturing," Int. J. Numer. Anal. Meth. Geomech., 2013, 25 pages.
Abousleiman et al, "Poroviscoelastic Analysis of Borehole and Cylinder Problems," ACTA Mechanica, vol. 119, published in 1996, 21 pages.
Abousleiman et al, "Geomechanics Field and Laboratory Characterization of Woodford Shale: The Next Gas Play," SPE International, SPE 110120, Society of Petroleum Engineers (SPE), presented at the 2007 SPE Annual Technical Conference and Exhibition on Nov. 11-14, 2007, 14 pages.
Abousleiman et al, "GeoGenome Industry Consortium (G2IC)," JIP, 2004-2006, 6 pages.
Abousleiman et al., "Mandel's Problem Revisited," Geotechnique, 46:2, 1996, 9 pages.
Abousleiman et al., "Mechanical Characterization of Small Shale Samples subjected to Fluid Exposure using the Inclined Direct Shear Testing Device," Int. J. Rock Mech. & Min. Sci., 47:3, 2010, 13 pages.
Abousleiman et al., "Poroelastic Solutions in Transversely Isotropic Media for Wellbore and Cylinder," Int. J. Solids Structures, 35:34-35, 1998, 25 pages.
Abousleiman et al., "GeoMechanics Field Characterization of the Two Prolific U.S. Mid-West Gas Plays with Advanced Wire-Line Logging Tools," SPE 124428, Society of Petroleum Engineers (SPE), SPE International, presented at the 2009 SPE Annual Technical Conference and Exhibition, Oct. 4-7, 2009, 19 pages.
Abousleiman et al., "The Granular and Polymer Composite Nature of Kerogen-Rich Shale," Acta Geotechnica, Feb. 5, 2016, 24 pages.
Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.
Agilent Technologies, "Field-Deployable Solution for Nanoporosity Measurements in Mud Logging Operations and a Novel Method for Fracability Analysis Using Mud Cuttings," Agilent Technologies, Oct. 2013, 44 pages.
Al-Kattan and Al-Ameri, "Estimation of the Rock Mechanical Properties Using Conventional Log Data in North Rumaila Field," Iraqi Journal of Chemical and Petroleum Engineering, 13:4, Dec. 2012, 7 pages.
Allan et al., "A Multiscale Methodology for the Analysis of Velocity Anisotropy in Organic-Rich Shale," Geophysics, 80:4, Jul.-Aug. 2015, 16 pages.
Altowairqi, "Shale elastic property relationships as a function of total organic carbon content using synthetic samples," Journal of Petroleum Science and Engineering 133, Sep. 2015, 9 pages.
Ananthan et al., "Influence of Strain Softening on the Fracture of Plain Concrete Beams," Int. J. of Fracture, 45, 1990, 25 pages.
Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.
Archer and Rasouli, "A log based analysis to estimate mechanical properties and in-situ stresses in a shale gas well in North Perth Basin," Petroleum and Mineral Resources, WIT Transactions on Engineering Sciences, 81, 2012, 12 pages.
Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.

Ballice, "Solvent Swelling Studies of Goynuk (Kerogen Type-I) and Beypazari Oil Shales (Kerogen Type-II)," Science Direct, Fuel 82, 2003, 5 pages.
Bazant et al., "Deformation of Progressively Cracking Reinforced Concrete Beams," ACI Journal, Technical Paper, Title No. 81-26, 81:3, May-Jun. 1984, 11 pages.
Bazant et al., "Size Effect in Brazilian Split-Cylinder Tests: Measurements and Fracture Analysis," ACI Materials Journal, 88:3 (325-332), May 31, 1991.
Bazant et al., "Strain-Softening Bar and Beam: Exact Non-Local Solution," Int. J. Solids Structures, 24:7, 1988, 15 pages.
Behura et al., "The shear properties of oil shales," Special Selection: Unconventional Resources and CO2 Monitoring, The Leading Edge, Jul. 2009, 6 pages.
Bennett et al., "Instrumented Nanoindentation and 3D Mechanistic Modeling of a Shale at Multiple Scales," Acta Geotechnica, 10:21, Jan. 9, 2015, 14 pages.
Bhandari et al., "Two-Dimensional DEM Analysis of Behavior of Geogrid-Reinforced Uniform Granular Bases under a Vertical Cyclic Load," Acta Geotechnica, 2014, 12 pages.
Biot et al., "Temperature analysis in hydraulic fracturing," Journal of Petroleum Technology, Nov. 1987, 39(11): 1389-1397.
Biot, "General Theory of Three-Dimensional Consolidation," Journal of Applied Physics, 12:2, Feb. 1941, 11 pages.
Bobko et al., "The Nanogranular Origin of Friction and Cohesion in Shale—A Strength Homogenization Approach to Interpretation of Nanoindentation Results," Int. J. Numer. Anal. Meth. Geomech., 2010, 23 pages.
Boskey et al., "Perspective—Collagen and Bone Strength," Journal of Bone and Mineral Research, 14:3, 1999, 6 pages.
Bousige et al., "Realistic molecular model of kerogen's nanostructure," Nature Materials, Advance Online Publication, Feb. 1, 2016, 8 pages.
Brochard et al., "Fracture Properties of Kerogen and Importance for Organic-Rich Shales," Annual World Conference on Carbon (Carbon 2013), Jul. 2013, 5 pages.
Bunzil et al., "Taking advantage of luminescent lanthanide ions," Chemical Society Reviews, Dec. 2005, 29 pages.
Cahill et al., "Nanoscale Thermal Transport II," Applied Physics Reviews 1.1, 2014, 46 pages.
Cahill et al., "Nanoscale thermal transport," Journal of applied physics, Jan. 2003, 93:2 (793-818).
Carcione and Avseth, "Rock-physics templates for clay-rich source rocks," Geophysics 80:5 (D481-D500), Sep. 2015, 21 pages.
Carter and Hanson, "Fake Moon Dirt, HOOD Solar System Science," UT Dallas Magazine, 6:2, Spring 2016, 1 page.
Chang et al., "Magnetic SERS Composite Nanoparticles for Microfluidic Detection," 251st ACE National Meeting, Mar. 13-17, 2016, 1 pages.
Chen et al., "Size Effect in Micro-Scale Cantilever Beam Bending," "Acta Mech., 2011, 17 pages.
Chen et al., "FITC functionalized magnetic core-shell $Fe_3O_4$/Ag hybrid nanoparticle for selective determination of molecular biothiols," Elsevier Ltd., Dec. 2013, 7 pages.
Chern et al., "Deformation of Progressively Cracking Partially Prestressed Concrete Beams," PCI Journal, 37:1, 1992, 11 pages.
Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.
Chupin et al., "Finite Strain Analysis of Nonuniform Deformation Inside Shear Bands in Sands," Int. J. Numer. Anal. Meth. Geomech., 2012, 16 pages.
Committee on Field Tests, "International Society of Rock Mechanics—Commission on Standardization of Laboratory and Field Tests, Suggested methods for quantitative description of discontinuities in rock," Int. J. Rock Mech. Min. Sci. & Geomech. Abstr. 15: 319-368, Committee on Field Tests, Oct. 1977, 50 pages.
Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

(56) References Cited

OTHER PUBLICATIONS

Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.
Custelcean et al., "Aqueous Sulfate Separation by Crystallization of Sulfate-Water Clusters," Angew. Chem. Int. Ed., 2015, 54: 10525-10529.
Daneshy, "Hydraulic Fracturing to Improve Production," Tech 101, TheWayAhead, 6:3, Oct. 2010, 4 pages.
Danuor et al., "Determination of the Source and Depositional Environment of Sediments of Lake Bosumtwi using X-Ray Diffraction (XRD) Techniques," International Research Journal of Geology and Mining (IRJGM) 2:7 (186-198), Sep. 2012, 13 pages.
Das et al., "Molecular Fluorescence, Phosphorescence, and Chemiluminescence Spectrometry," Analytical Chemistry, Nov. 3, 2011, 29 pages.
De Block et al., "A New Solution for the Characterization of Unconventional Shale Resources Based on Analysis or Drill Cutting," SPE-177601-MS, Society of Petroleum Engineers (SPE), SPE International, presented at the Abu Dhabi International Petroleum Exhibition and Conference, Nov. 9-12, 2015, 6 pages.
Deans, "Using Chemical Tracers to Measure Fractional Flow and Saturation In-Situ," SPE 7076, Society of Petroleum Engineers (SPE), presented at SPE Symposium on improved Methods of Oil Recovery, Apr. 16-17, 1978, 10 pages.
Deere et al., "Engineering classifications and index properties for intact rock," Technical Report No. AFWL-TR 65-116, Air Force Weapons Library, Kirtland Air Force Base, New Mexico, USA, Dec. 1966, 327 pages.
Deirieh et al., "Nanochemomechanical Assessment of Shale: A Coupled WDS-Indentation Analysis," Acta Geotechnica, 2012, 25 pages.
Delafargue and Ulm, "Explicit approximations of the indentation modulus of elastically orthotropic solids for conical indenters," International Journal of Solids and Structures 41:26, Dec. 2004, 10 pages.
Devarapalli et al., "Micro-CT and FIB-SEM imaging and pour structure characterization of dolomite rock at multiple scales," Arabian Journal of Geosciences, Aug. 2017, 9 pages.
Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.
Ekbote et al., "Porochemoelastic Solution for an Inclined Borehole in a Transversely Isotropic Formation," J. of Eng. Mech., ASCE, Jul. 2006, 10 pages.
El-Aneed et al., "Mass Spectrometry, Review of the Basics: Electrospray, MALDI, and Commonly Used Mass Analyzers," Applied Spectroscopy Reviews, Mar. 16, 2009, 22 pages.
Elijah, "Numerical Modeling of Wellbore Instability (Tensile Failure) Using Fracture Mechanics Approach," Thesis for the degree of Master of Science, African University of Science and Technology Abuja, May 2013, 77 pages.
Elkatatny et al., "Development of a new correlation to determine the static Young's modulus," Journal of Petroleum Exploration and Production Technology, 8:1, Mar. 2018, 14 pages.
Equotip, "Equotip Operating Instructions," Manual, 2016, PROCEQ, 52 pages.
Ertas et al., "Petroleum Expulsion Part 1. Theory of Kerogen Swelling in Multicomponent Solvents," Energy & Fuels, 2006, 6 pages.
Esfahani et al., "Quantitative nanoscale mapping of three-phase thermal conductivities in filled skutterudites via scanning thermal microscopy," National Science Review, Feb. 2017, 5:1 (59-69).
Ewy , "Shale Swelling/Shrinkage and Water Content Change due to Imposed Suction and Due to Direct Brine Contact," Acta Geotechnica, 2014, 18 pages.

Frazer et al., "Localized Mechanical Property Assessment of SiC/SiC Composite Materials," Science Direct, 2015, Part A:70 (93-101).
Gao et al., "Materials Become Insensitive to Flaws at Nanoscale: Lessons from Nature," PNAS, May 13, 2003, 100:10 (5597-600).
Gardiner et al., "Practical Raman Spectroscopy," Springer-Verlag, 1989, 9 pages.
Garnero, "The Contribution of Collagen Crosslinks to Bone Strength," Int. Bone & Mineral Society, Sep. 2012, 8 pages.
Georgi et al., "Physics and Chemistry in Nanoscale Rocks", SPE Forum Series: Frontiers of Technology, Mar. 22-26, 2015, La Jolla, California, USA, 4 pages.
Glossary.oilfield.slb.com' [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.
Glover et al., "The Use of Measurements Made on Drill Cuttings to Construct and Apply Geomechanical Well Profiles," ARMA 16-0737, ARMA, presentation at the 50th US Rock Mechanics/Geomechanics Symposium, Jun. 26-29, 2016, 11 pages.
Goodman, "Chapter 3: Rock Strength and Failure Criteria," in Introduction to Rock Mechanics, John Wiley & Sons, 21 pages.
Han et al., "Chapter 2: Principles of Drilling and Excavation," in Drilling in Extreme Environments: Penetration and Sampling on Earth and Other Plants, Aug. 2009, 107 pages.
Han et al., "LBM-DEM Modeling of Fluid-Solid Interaction in Porous Media," Int. J. Numer. Anal. Meth. Geomech., 2013, 37: 1391-1407.
Han et al., "Numerical Modeling of Elastic Hemispherical Contact for Mohr-Coulomb Type Failures in Micro-Geomaterials," Experimental Mechanics, 57, Jun. 16, 2017, 15 pages.
Han et al., "Application of Silver-Coated Magnetic Microspheres to a SERS-Based Optofluidic Sensor," The Journal of Physical Chemistry (JPCC), Mar. 7, 2011, 7 pages.
Havens, "Mechanical Properties of the Bakken Formation," thesis for degree of Master of Science (Geophysics) at the Colorado School of Mines, Department of Geophysics, 2012, 123 pages.
Hillier, "Accurate quantitative analysis of clay and other minerals in sandstones by XRD: comparison of a Rietveld and a reference intensity ratio (RIR) method and the importance of sample preparation," Clay Minerals, 2000, 35:391-302.
Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, Aug. 2012, 112, 16 pages.
Hornby et al., "Anisotropic Effective-Medium Modeling of the Elastic Properties of Shales," Geophysics, Oct. 1994, 59:10 (1570-1583).
Hosemann et al, "Mechanical Characteristics of SiC Coating Layer in TRISO Fuel Particles," Journal of Nuclear Materials, 2013, 442: 133-142.
Hosemann et al., "An Exploratory Study to Determine Applicability of Nano-Hardness and Micro-compression Measurements for Yield Stress Estimation," Science Direct, 2008, 375: 135-143.
Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 2014, 4:7204, 10 pages.
Hull and Abousleiman, "Chapter 10: Insights of the Rev of Source Shale from Nano- and Micromechanics," in New Frontiers in Oil and Gas Exploration, Springer International Publishing Switzerland, 2016, 29 pages.
Huseby et al., "High Quality Flow Information from Tracer Data," SPE-169183-MS, Society of Petroleum Engineers (SPE), presented at the SPE Bergen One Day Seminar, Grieghallen, Bergen, Norway, Apr. 2, 2014, 9 pages.
Hutchins et al., "Aqueous Tracers for Oilfield Applications," SPE-21049, Society of Petroleum Engineers (SPE), presented at the SPE International Symposium on Oilfield Chemistry, Anaheim, California, Feb. 20-22, 1991; Society of Petroleum Engineers, 1991, 9 pages.

(56) References Cited

OTHER PUBLICATIONS

Hydraulic Fracturing Fluid Product Component Information Disclosure; 2 pages.

Iqbal et al., "In situ micro-cantilver tests to study fracture properties of NiAl single crystals," Acta Materialia, Feb. 2012, 60:3 (1193-1200).

Itasca (online), "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

Iyengar et al., "Analysis of Crack Propagation in Strain-Softening Beams," Engineering Fracture Mechanics, 2002, 69: 761-778.

Jia et al., "Highly Efficient Extraction of Sulfate Ions with a Tripodal Hexaurea Receptor," Angew. Chem. Int. Ed., 2011, 50: 486-490.

Jianhong et al., "Estimation of the Tensile Elastic Modulus using Brazilian disc by Applying Diametrically Opposed Concentrated Loads," International Journal of Rock Mechanics & Mining Sciences, 2009, 46(3): 568-576.

Jose et al., "Continuous multi cycle nanoindentation studies on compositionally graded $Ti_{1-x}Al_xN$ multilayer thin films," Materials Science and Engineering, Elsevier, Apr. 2011, 528(21): 6438-6444.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kadhim et al., "Using Well Logs Data to Estimate Dynamic Elastic Properties of Carbonate Formation," International Journal of Physical and Human Geography, Jun. 2016, 4(2): 1-15.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, 2006, 20: 301-308.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Khatibi et al., "Raman spectroscopy to study thermal maturity and elastic modulus of kerogen," International Journal of Coal Geology, Jan. 2018, 185: 103-118.

Kim et al., "Numerical analysis of fracture propagation during hydraulic fracturing operations in shale gas systems," International Journal of Rock and Mechanics Mining Sciences 76, 2015.

Klapetek, "Chapter 11: Thermal Measurements," Quantitative Data Processing in Scanning Probe Microscopy: SPE Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 2009, 4: 315-318.

Kumar et al., "Nano to Macro Mechanical Characterization of Shale," SPE 159804, Presented at the SPE Annual Technical Conference and Exhibition, San Antonio, Texas, Oct. 8-10, 2012; Society of Petroleum Engineers, 2012, 23 pages.

Kwabi, "Mineral, Fluid, Elastic Property Quantification from Well Logs and Core Data in the Eagle Ford Shale Play: A Comparative Study," Thesis for Degree of Master of Science and Engineering at the University of Texas at Austin, Aug. 2013, 135 pages.

Lam et al., "Experiments and Theory in Strain Gradient Elasticity," J. Mech. and Phys. of Solids, 2003, 51: 1477-1508.

Larsen et al., "Changes in the Cross-Link Density of Paris Basin Toarcian Kerogen During Maturation," Organic Geochemistry, 2002, 33: 1143-1152.

Laurent Brochard et al., "Fracture Properties of Kerogen and Importance for Organic-Rich Shales" Annual World Conference on Carbon (Carbon 2013), Jul. 2013, Rio de Janeiro, Brazil. HAL ID: hal-01274161, 5 pages.

Lee et al., "Comparison of different methods to estimate uniaxial compressive strength in a Barnett shale," in proceedings of the 50th US Rock Mechanics/Geomechanics Symposium, ARMA 16-0455, Jun. 26-29, 2016, 9 pages.

Lee et al., "New application of rebound hardness numbers to generate logging of unconfined compressive strength in laminated shale formations," in proceedings of the 48th US Rock Mechanics/Geomechanics Symposium, Minneapolis, MN, AMRA 14-6972, Jun. 1-4, 2014, 7 pages.

Lee, "A study on rock slope stability in Boeun region using distinct element method," MS Thesis, Department of Earth System Sciences, Yonsei University, Seoul, South Korea, 2001, English Translation.

Lee, "Calibration of rebound hardness numbers to unconfined compressive strength in shale formations," Journal of Petroleum Technology, JPT, Jan. 2015, 5 pages.

Lee, "Time-dependent crack growth in brittle rocks and field applications to geologic hazards," PhD Dissertation. Department of Mining and Geological Engineering, University of Arizona, Tucson, AZ 2007, 272 pages.

Leeb, "New dynamic method for hardness testing of metallic materials," VDI-Report, 308: 123-128, 1978, 5 pages.

Li et al., "Mechanical Characterization of Micro/Nanoscale Structures for MEMS/NEMS Applications using Nanoindentation Techniques," Science Direct, 2003, 775 pages.

Li et al., "The Brazilian Disc Test for Rock Mechanics Applications: Review and New Insights," Rock Mech Rock Eng, 2013, 46: 269-287.

Liu, "Dimension effect on mechanical behavior of silicon microcantilver beams," Measurement, 41:8, Oct. 2008, 11 pages.

Liu, "Elastic Constants Determination and Deformation Observation Using Brazilian Disk Geometry," Experimental Mechanics, 2010, 50: 1025-1039.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilver Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia, 7 pages.

Luan et al., "Creation of synthetic samples for physical modelling of natural shale," Geophysical Prospecting, 64, Jul. 2016, 17 pages.

Mahabadi et al., "A novel approach for micro-scale characterization and modeling of geomaterials incorporating actual material heterogeneity," Geophysical Research Letters, American Geophysical Union, 39:1 (L01303), Jan. 1, 2012, 6 pages.

Mahmoud et al., "Removal of Pyrite and Different Types of Iron Sulfide Scales in Oil and Gas Wells without H2S Generation," IPTC-18279-MS, presented at the International Petroleum Technology Conference (IPTC), Doha, Qatar, Dec. 6-9, 2015, 8 pages.

Maio et al., "Measuring Fracture Toughness of Coatings using Focused-ion-beam-machined Microbeams," 2004, 4 pages.

Marchetti et al., "Fluorous affinity chromatography for enrichment and determination of perfluoroalkyl substances," Annual Review of Analytical Chemistry 84, Jul. 19, 2012, 8 pages.

Marinos and Hoek, "Estimating the geotechnical properties of heterogeneous rock masses such as flysch," Bull. Enginng. Geol. & the Environment (IAEG), 60:85-92, 2001, 8 pages.

Maxwell, "Microseismic hydraulic fracture imaging: The path toward optimizing shale gas production," The Leading Edge, Mar. 2011, 6 pages.

McCann and Entwisle, "Determination of Young's modulus of the rock mass from geophysical well logs," Geological Applications of Wireline Logs II, Geological Society of Special Publication 65, Dec. 1, 1992, 9 pages.

Mesa, "Spherical and rounded cone nano indenters," Micro Star Technologies Inc., available on or before Jan. 23, 2018, 24 pages.

Montaut et al., "Detection and quantification of rock physics properties for improved hydraulic fracturing in hydrocarbon-bearing shale," SPWLA 54th Annual Logging Symposium, Jun. 22-26, 2013, 16 pages.

(56) References Cited

OTHER PUBLICATIONS

Montgomery, "Chapter 2: Fracturing Fluid Components," in Intech open science | open minds, Montgomery, 2013, 21 pages.

Moyer, "A Case for Molecular Recognition in Nuclear Separations: Sulfate Separation from Nuclear Wastes," Inorganic Chemistry, 2012, 3473-3490.

Moyner et al., "The Application of Flow Diagnostics for Reservoir Management," Society of Petroleum Engineers (SPE), Apr. 2015, 18 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Ortega et al., "The Effect of Particle Shape and Grain-Scale Properties of Shale: A Micromechanics Approach," Int. J. Numer. Anal. Methd. Geomech., 2010, 33 pages.

Ortega et al., "The Effect of the Nanogranular Nature of Shale on their Poroelastic Behavior," Acta Geotechnica, 2007, 28 pages.

Ortega et al., "The Nanogranular Acoustic Signature of Shale," Geophysics, 74:3, May-Jun. 2009, 20 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," Society of Petroleum Engineers (SPE), International, CPS/SPE International Oil & Gas Conference and Exhibition, Beijing, China, Jun. 8-10, 2010, 29 pages.

Petoud et al., "Brilliant SM, Eu, Tb, and Dy Chiral Lanthanide Complexes with Strong Circularly Polarized Luminescence," Journal of the American Chemical Society (JACS), Dec. 15, 2006, 7 pages.

Podio et al., "Dynamic Properties of Dry and Water-Saturated Green River Shale under Stress," SPE 1825, Society of Petroleum Engineers (SPE), Jun. 11, 1968, 16 pages.

Pollard et al., "Fundamentals of Structural Geology," Cambridge University Press, Sep. 1, 2005, p. 291.

Pollock and Hammiche, "Micro-thermal analysis: techniques and applications," Journal of Physics D: Applied Physics, 34.9, 2001, 31 pages.

Poon et al., "An Analysis of Nanoindentation in Linearly Elastic Solids," International Journal of Solids and Structures, 45:24, Dec. 1, 2008, 16 pages.

Potter and Foltinek, "Formation elastic parameters by deriving S-wave velocity logs," CREWES Research Report, 9, Jan. 1997, 13 pages.

Prasad et al., "Acoustic Signatures, Impedance Microstructure, Textural Scales and Anisotrophy of Kerogen-Rich Shales," SPE 124840-MS, Society of Petroleum Engineers (SPE), Annual Technical Conference and Exhibition, Oct. 4-7, 2009, 13 pages.

Proceq S.A. 2014. 2014 Equotip, Copyright, Switzerland, 1 page.

Rajbanshi et al., "Sulfate Separation from Aqueous Alkaline Solutions by Selective Crystallization of Alkali Metal Coordination Capsules," Cryst. Growth Des., 2011, 2702-2706.

Rezaee et al., "Depositional Environment Interpretation of Lar Formation (Upper Jurassic) Based on Study of Clay Mineralogy and Microfacies in East Azarbaijan (North Western of Iran)," Asian Journal of Earth Sciences, 7:1 (17-26), 2014, 10 pages.

Richard et al, "Slow Relaxation and Compaction of Granular Systems," Nature Materials, 4, Feb. 2005, 8 pages.

Rowan et al., "Dynamic Covalent Chemistry," Angewante Chemie International Edition, Mar. 15, 2002, 55 pages.

Selvin et al., "Principles and biophysical applications of lanthanide-based probes," Annual Review of Biophysics and Biomolecular Structure, Jun. 2002, 28 pages.

Serres-Piole et al., "Water tracers in oilfield applications: Guidelines," Elsevier Ltd., Journal of Science and Engineering, Nov. 2012, 18 pages.

Shahid et al., "Natural-fracture reactivation in shale gas reservoir and resulting microseismicity," Journal of Canadian Petroleum Technology 54.06, 2015.

Sharma and Arya, "Formation strength estimation from well log data for sand cut analysis in Tapti—Daman Area, Western Offshore Basin, India," presented at the 6th International Conference and Exposition on Petroleum Geophysics, Kolkata 2006, Jan. 9-11, 2006, 4 pages.

Shin et al., "Development and Testing of Microcompression for Post Irradiation Characterization of ODS Steels," J. Nuclear Materials, 2014, 6 pages.

Shook et al., "Determining Reservoir Properties and Flood Performance from Tracer Test Analysis," SPE 124614, Society of petroleum Engineers (SPE), presented at SPE Annual Technical Conference and Exhibition, Oct. 4-7, 2009, 19 pages.

Shukla et al., "Nanoindentation Studies on Shales," ARMA 13-578, ARMA, presented at the 47th US Rock Mechanics/Geomechanics Symposium, Jun. 23-26, 2013, 10 pages.

Sierra et al., "Woodford Shale Mechanical Properties and the Impacts of Lithofacies," ARMA 10-461, copyright 2010, 10 pages.

Singh et al., "Facies classification based on seismic waveform," presented at the 5th Conference & Exposition on Petroleum Geophysics, Jan. 15-17, 2004, 7 pages.

Siskin et al., "Reactivity of organic compounds in hot water: geochemical and technological implications," Science, Oct. 11, 1991, 8 pages.

Slatt et al., "Merging Sequence Stratigraphy and Geomechanics for Unconventional Gas Shales," The Leading Edge, Mar. 2011, 8 pages.

Slatt et al., "Outcrop/Behind Outcrop (Quarry), Multiscale Characterization of the Woodford Gas Shale," 2011, 22 pages.

Sone and Zoback, "Mechanical Properties of Shale-Gas Reservoir Rocks, Part 1: Static and dynamic elastic properties and anisotropy," Geophysics 78:5, Sep.-Oct. 2013, 12 pages.

Sone et al., "Mechanical Properties of Shale-Gas Reservoir Rocks, Part 2: Ductile creep, brittle strength, and their relation to the elastic modulus," Geophysics 78:5, Sep.-Oct. 2013, 10 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.

Stiles et al., "Surface-enhanced Raman Spectroscopty," Annual Review of Analytical Chemistry, Mar. 18, 2008, 29 pages.

Tabatabaei et al., "Well performance diagnosis with temperature profile measurements," Society of Petroleum Engineers (SPE), in SPE Annual Technical Conference and Exhibition, Society of Petroleum Engineers, Oct. 30-Nov. 2, 2011, Jan. 2011, 16 pages.

Tian et al., "Off-Resonant Gold Superstructures as Ultrabright Minimally Invasive Surface-Enhanced Raman Scattering (SERS) Probes," American Chemical Society, Jul. 2015, 7 pages.

Till and Spears, "The determination of quartz in sedimentary rocks using an x-ray diffraction method," Clays and Clay Minerals, 17: 323-327, 1969, 5 pages.

Ulm et al., "Material Invariant Poromechanics Properties of Shales," 2005, 8 pages.

Ulm et al., "The Nanogranular Nature of Shale," Acta Geotechnica, 2006, 12 pages.

Vanlandingham, "Review of Instrumented Indentation," Journal of Research of the National Institute of Standards and Technology, 108:4, Jul.-Aug. 2003, 17 pages.

Vernik and Landis, "Elastic Anisotropy of Source Rocks: Implications for Hydrocarbon Generation and Primary Migration," 80:4, Apr. 1996, 14 pages.

Vernik et al., "Ultrasonic Velocity and Anisotropy of Hydrocarbon Source Rocks," Geophysics, 57:5, May 1992, 9 pages.

(56) References Cited

OTHER PUBLICATIONS

Walters et al., "Inetic rheology of hydraulic fracturing fluids," Society of Petroleum Engineers (SPE), SPE Annual Technical Conference and Exhibition, Society of Petroleum Engineers, 2001.
Wang et al., "Iron Sulfide Scale Dissolvers: How Effective Are They?" SPE 168063, Society of Petroleum Engineers (SPE), presented at the SPE Saudi Arabia section Annual Technical Symposium and Exhibition, May 19-22, 2013, 22 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 41:2 (245-253).
Warpinski, "Understanding Hydraulic Fracture Growth, Effectiveness, and Safety Through Microseismic Monitoring," Intech, May 17, 2013, 14 pages.
Wegst et al., "Bioinspired structural materials," Nature Materials, 14, Jan. 2015, 14 pages.
Wenk et al., "Preferred Orientation and Elastic Anisotropy of Illite-Rich Shale," Geophysics, 72:2, Mar.-Apr. 2007, 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.
West and Shakoor, "Chapter 8: Engineering properties of rocks," in Geology Applied to Engineering, 2nd Edition, Waveland Press, Inc, ISBM 1-4786-3500-2, p. 170, 2018, 1 page.
White et al., "A thermoplasticity model for oil shale," LLNL-CONF-667671, Lawrence Livermore National Labtoratory, presented at the Fifth International Conference on Coupled Thermo-Hydro-Mechanical-Chemical Processes in Geosystems, Feb. 25-27, 2015, 20 pages.
Wilson et al., "Fracture testing of bulk silicon microcantilever beams subjected to a side load," Journal of Microelectromechanical Systems, 5:3, Sep. 1996, 9 pages.
Wu et al., "A reusable biosensor chip for SERS-fluorescence dual mode immunoassay," Proc. SPIE 9543, Third International Symposium on Laser Interaction with Matter, 954317, May 4, 2015, 6 pages.
Wu et al., "A SERS-Assisted 3D Barcode Chip for High-Throughput Biosensing," Small Journal 11:23, Jun. 11, 2015, 9 pages.
Wurster et al., "Characterization of the fracture toughness of micro-sized tungsten single crystal notched specimens," Philosophical Magazine, 92:14, May 2012, 23 pages.
Xu et al., "Measurement of two-photon excitation cross sections of molecular fluorophores with data from 690 to 1050 nm," Journal of the Optical Society of America B, Mar. 1996, 11 pages.
Yan and Han, "Measurement of elastic properties of kerogen," SEG Houston 2013 Annual Meeting, SEG Technical Program Expanded Abstracts, Sep. 2013, 5 pages.
Yang et al., "Nanoscale geochemical and geomechanical characterization of organic matter in shale," Nature Communications, 8:2179, Dec. 19, 2017, 9 pages.
Zamberi et al., "Improved Reservoir Surveillance Through Injected Tracers in a Saudi Arabian Field: Case Study," SPE 166005, Society of Petroleum Engineers (SPE), presented at SPE Reservoir Characterization and Simulation Conference and Exhibition, Sep. 16-18, 2013, 15 pages.
Zemel, "Chapter 3: Interwell Water Tracers," in Tracers in the Oil Field, 43, 1st Edition, Elsevier Science, Jan. 13, 1995, 47 pages.
Zeszotarski et al., "Imaging and Mechanical Property Measurements of Kerogen via Nanoindentation," Geochimica et Cosmochimica Acta, 68:20, Oct. 15, 2004, 7 pages.
Zhou et al., "Upconversion luminescent materials: advances and applications," Chem Rev., Jan. 14, 2015, 71 pages.
PCT International Search Report and Written Opinion in International Appln. No. PCT/US2021/025960, dated Jul. 21, 2021, 15 pages.
Kimber, "X-Ray Diffraction of Lacustrine Mineral as an Indicator of Late Pleistocene and Holocene Paleoclimate, Tulare Lake, California," A Thesis Submitted to the Department of Geological Sciences California State University, Bakersfield, In Partial Fulfillment for the Degree of Masters of Science in Geology, Jun. 2018.

* cited by examiner

US 11,549,894 B2

DETERMINATION OF DEPOSITIONAL ENVIRONMENTS

BACKGROUND

The production of crude oil and other hydrocarbons starts with the drilling of a wellbore into a hydrocarbon reservoir. In many cases, the hydrocarbon reservoir is a narrow layer of material in the subterranean environment, making efficient targeting of the wellbore important for productivity. Accordingly, identifying the reservoir layer is important for determining the wellbore location, and drilling the wellbore to that location, for example, by directional drilling.

A depositional environment in which the rock of the reservoir layer, and surrounding layers, formed is helpful for identifying the reservoir layer and locating a reservoir within the reservoir layer. The depositional environment is the environment in which the material forming the sedimentary rock and sand of the layers of the subterranean environment formed, such as in a river bed, a shoreline, or a lake, among others.

SUMMARY

In an implementation described herein, a method is provided for determining a depositional environment of a sample of a subterranean environment. The method includes measuring intensities for a crystallographic plane (CP) 100 peak and a CP 101 peak for quartz in a diffractogram, calculating a ratio of the intensities of the CP 100 peak to the CP 101 peak, and identifying a depositional environment for the sample from the ratio.

In another implementation described herein, a method is provided for determining a placement of a well in a reservoir. The method includes obtaining a sample of rock from a facies in a wellbore, grinding the sample to form a powder, and mounting the powder in a sample holder and inserting the sample holder in an x-ray diffraction instrument. An intensity is determined of a peak for a crystallographic plane (CP) 100 of quartz in the sample. An intensity is determined of the peak for a CP 101 of quartz in the sample. A ratio of the intensities for the CP 100 peak and the CP 101 peak is calculated. The ratio is compared to a correlation between ratios and depositional environments. The depositional environment for the sample is identified. The placement of the wellbore in the reservoir is determined, based, at least in part, on the depositional environment.

DETAILED DESCRIPTION

Techniques are provided herein for determining depositional environments using ratios of the relative X-ray diffraction peak intensities from the 100 and 101 crystallographic planes (CP) of quartz. As described herein, the techniques are able to distinguish between the depositional environments of the Unayzah (Permo-Carboniferous). This provides a simpler method than petrography for screening samples, such as rock samples from subterranean facies, to determine depositional environments.

The CP 100 and CP 101 are used because they represent the strongest diffraction peaks associated with quartz. The CP 100/101 ratio may be useful for this determination as the quartz median grain diameters are related to the energy and provenance of the depositional environment, and quartz is the dominant mineral composing the matrices of these rocks. Powder X-ray diffraction results indicate the matrices consist mainly of quartz (96%), with minor components including potassium feldspar (microcline) and plagioclase (albite), dolomite, anhydrite, halite and hematite (2%). Clay minerals may also be present in minor amounts, and include illite, mixed layer illite/smectite (I/S), kaolinite, and chlorite (2%). Because peak intensities are utilized, care has been exercised toward ensuring the baselines of the diffraction patterns have not been influenced by these minor mineral constituents.

Further, the sample preparation procedures have been selected to minimize preferred orientation. To evaluate potential preferred orientation, other quartz peak intensities of 112 and 211 compared to that 100 and 101 have also been evaluated. In general, the grinding and packing process of a powdered sample into the sample holder may result in a preferred orientation in some cases, which is seen in higher order diffractions. This effect is related to the broadening of the peak due to weakening of the crystal lattice, termed microstrain. During grinding, microstrain may be created in the crystals. Thereby, decreasing the peak intensities and broadening the area of the quartz diffraction peaks. Accordingly, a micronizer used for XRD samples should be utilized. If a different grinding technique is used between the samples, differences in microstrain may make the analysis of the ratios problematic. Checking the intensities at a higher angle from the diffraction pattern to see if these differ, mainly those from the 112 and 211 crystallographic planes, can be used to determine if some of the intensities recorded could be the result of preferred orientation due to sample preparation.

Figure 1:
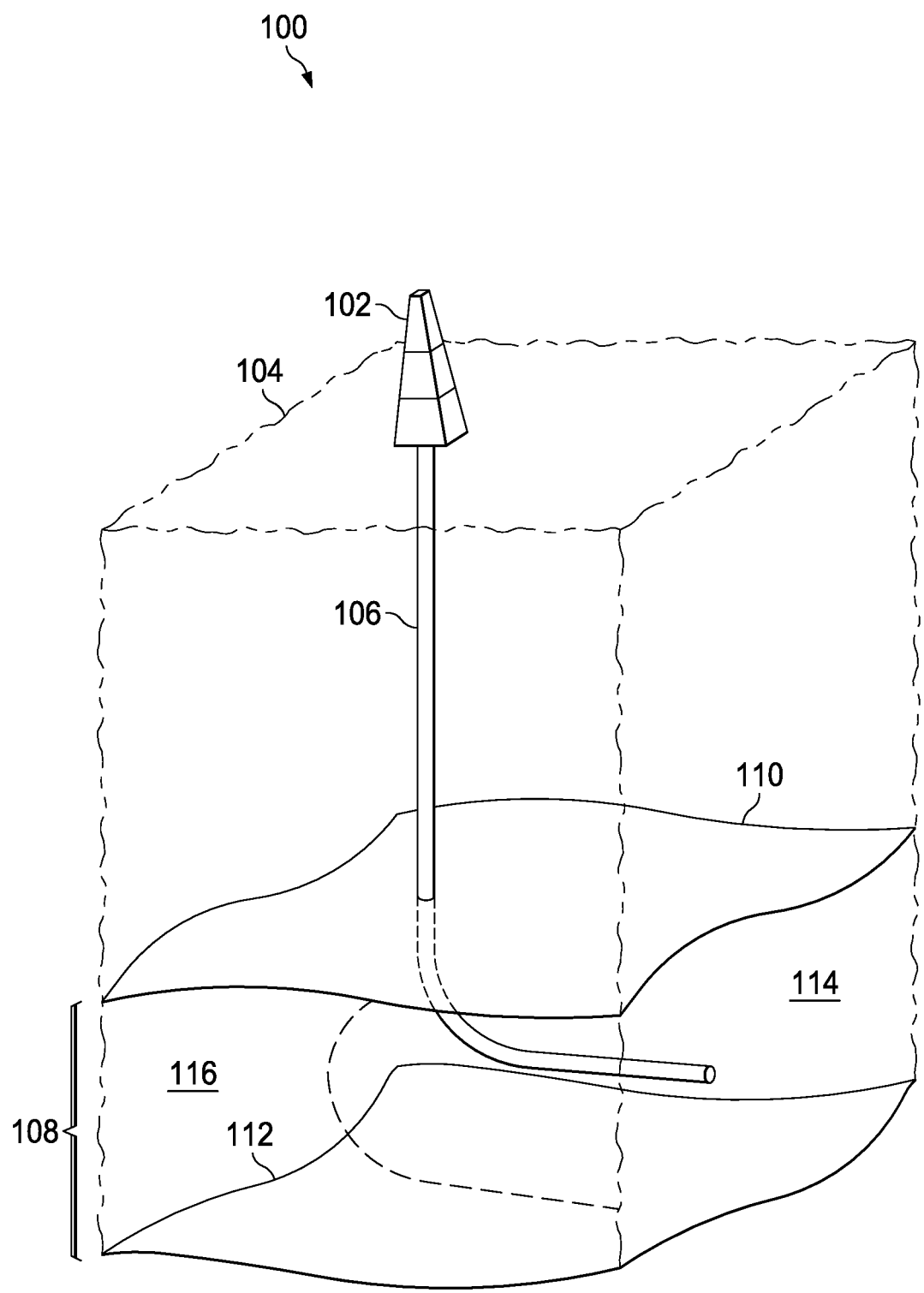
FIG. 1 is a schematic drawing of a method for drilling a well to a reservoir layer in a subterranean environment.

FIG. 1 is a schematic drawing of a method 100 for drilling a well to a reservoir layer in a subterranean environment. In the method 100, a drilling rig 102 at the surface 104 is used to drill a wellbore 106 to the reservoir layer 108. In this illustration, the reservoir layer 108 is bounded by an upper layer 110, such as a layer of cap rock, and a lower layer 112, such as a layer containing water.

As used herein, a facies is a body of rock that has related characteristics, such as a single type of sedimentary sandstone, a single type of sedimentary shale, and the like. Further, the depositional environment of the body of rock, as discussed further with respect to FIG. 3, may provide the related characteristics that define a facies. Certain types of facies are more likely to be associated with the presence of hydrocarbons, such as sandstone, and other porous rock. Porous rock layers allow hydrocarbons to migrate to traps, for example, forming reservoirs below an impervious layer of rock, such as the upper layer 110, in this example. In other examples, facies with a high porosity, but a low permeability, may trap hydrocarbons in the pores, forming a tight reservoir.

The reservoir layer 108 is unlikely to have a uniform distribution of hydrocarbons. For example, one facies 114 in the reservoir layer 108 may have substantially higher amounts of hydrocarbons than another facies 116 in the reservoir layer 108. Accordingly, the determination of the depositional environment of the facies 114 and 116 present in the reservoir layer 108 and in the layers around the reservoir layer 108, such as the upper layer 110 and the lower layer 112, may help in locating facies with higher hydrocarbon content, termed reservoirs, and in determining the placement of the wellbore 106 in the reservoir layers and the reservoirs to improve hydrocarbon production.

The determination of the depositional environments of the facies in the layers of the subterranean environment may be combined with other types of information used for the identification of reservoir layers and the location of reservoirs within these layers. For example, seismic data collected from seismic analyses can indicate the likely presence of reservoirs, while the depositional environments of the facies may provide further information on locations of reservoirs in a reservoir layer. Accordingly, seismic data may be used along with the data on depositional environments to geosteer a well in a reservoir. Further, a seismic analyses may be performed to determine a location for drilling an exploratory well for collecting core samples, as described further with respect to FIG. 2.

Figure 2:
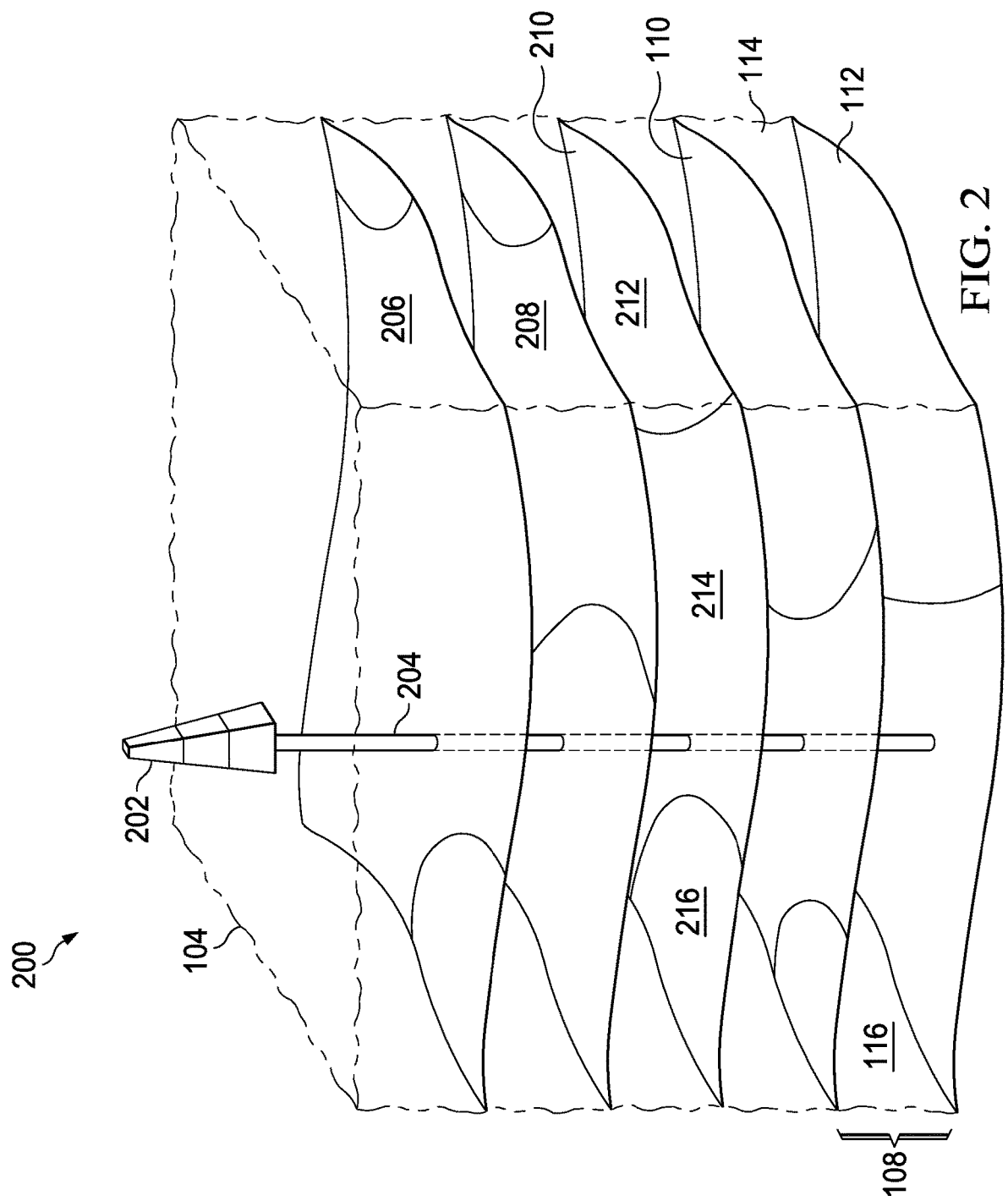
FIG. 2 is a drawing of different layers of material in a subterranean environment.

FIG. 2 is a drawing of different layers of material in a subterranean environment 200. Like numbered items are as described with respect to FIG. 1. In FIG. 2, a drilling rig 202 is used to drill an exploratory well 204 into the subterranean environment 200. Cuttings and core samples may be taken from the exploratory well 204 to determine the characteristics of layers in the subterranean environment 200, such as layers 110, 112, 206, 208, and 210. It may be noted that for simplicity's sake, the layers are shown as discrete surfaces within the subterranean environment 200. However, it should be clear that each of the layers shown often represents a continuum of material from layers above and layers below, although some, such as the upper layer 110 may be a discrete surface, for example, a cap rock.

The cuttings and core samples removed from the exploratory well 204 may be used in a petrography analysis to determine the depositional environment of the various facies, such as facies 212, 214, and 216 shown for the layer 210, or facies 114 and 116 in the reservoir layer 108. Actually, hundreds of cutting and core samples are received used to determine depositional models, for example, by means of performing thin section (TS) slides. However, TS slide processing may take hours to days to perform. Accordingly, the techniques described herein can be used as an initial analysis to determine the depositional model for the facies of the subject samples. This method is based on diffractograms (plots of XRD measurements) which may be produced in a short period of time. The peak intensities of crystallographic planes for quartz can be quickly computed from the diffractograms.

Figure 3:
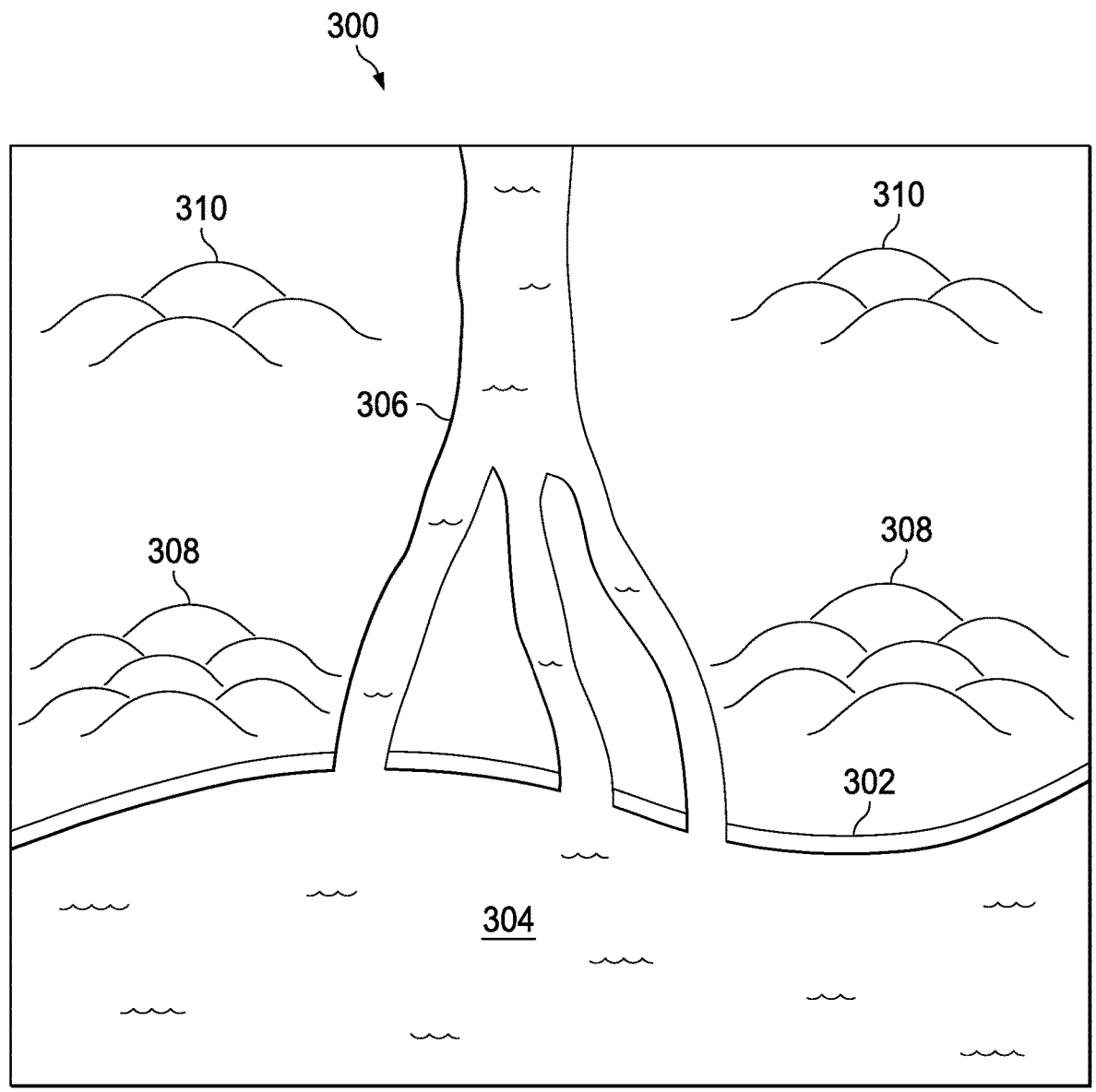
FIG. 3 is a drawing of the depositional environment that may be used to form a single layer found in the subterranean environment, described with respect to FIG. 2.

FIG. 3 is a drawing of the depositional environment 300 that may be used to form a single layer found in the subterranean environment, described with respect to FIG. 2. Higher energy environments often result in smaller particle size, which correlates to a change in the ratio of the CP 100/101 intensities for quartz. The highest energy environment in the sample studied was a shoreline environment 302 of a lake 304, wherein wave action may contribute to smaller particle size material. The shoreline environment 302 gives rise to deposits of shoreline lake facies in layers in the subterranean environment.

The next highest energy environment in the depositional environment 300 is the riparian, or fluvial environment 306. The fluvial environment 306 provides significant energy to particulates from water flowing through the riverbed, which results in the reduction of particle size. The fluvial environment 306 gives rise to deposits of fluvial facies in layers in the subterranean environment.

The next highest energy environment in the depositional environment 300 is the coastal dunes environment 308. The coastal dunes environment 308 has less wave action than the shoreline environment 302, but may have substantial winds coming off the lake 304. These winds may result in smaller particle sizes from abrasion.

The lowest energy environment in the depositional environment 300 of FIG. 3 is the inland dunes, or dunes environment 310. The dunes environment 310 is generally not subjected to forces from the river flow in the fluvial environment 306, the wave action in the shoreline environment 302, or the higher winds of the coastal dunes environment 308. Accordingly, the particle sizes in the dunes facies may be larger than in the other environments.

As described herein, the results indicate the CP 100/101 ratio changes according to the depositional environments, for example, as determined by petrography. In order of the increasing energy of the depositional environment, the shoreline lake facies has a ratio of between about 0.14 and about 0.16, or about 0.15, the fluvial facies has a ratio of between about 0.22 and about 0.24, or about 0.23, the coastal dune facies has a ratio of between about 0.26 and about 0.31, or about 0.28, and the dune facies has a ratio of between about 0.30 and about 0.39, between about 0.39 and about 0.55, about 0.34, about 0.41, or about 0.47.

Figure 4A:
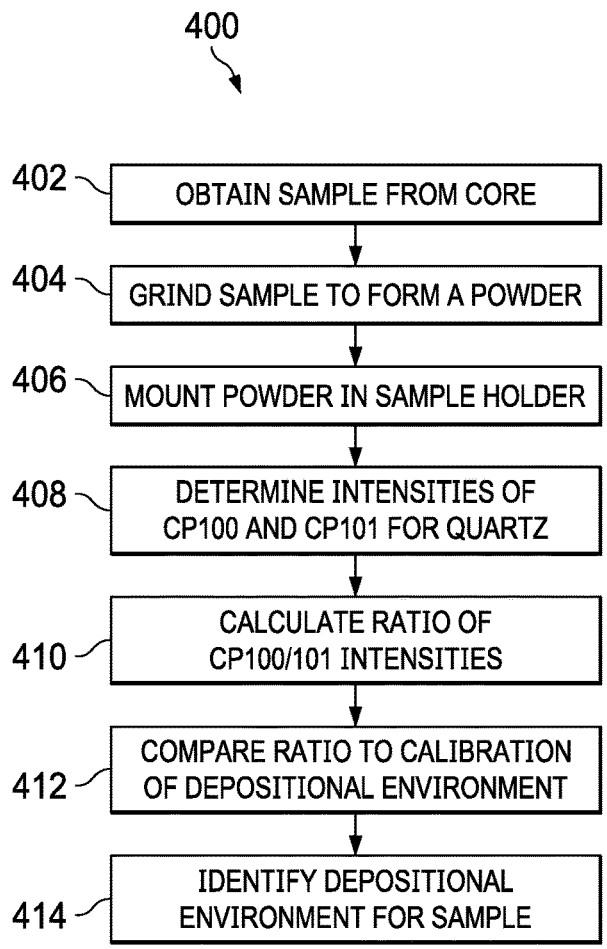
FIGS. 4A and 4B are process flow diagrams of a method 400 for determining a depositional environment from the intensity ratio of the CP 100 and 101 scattering peaks for quartz.
Figure 4B:
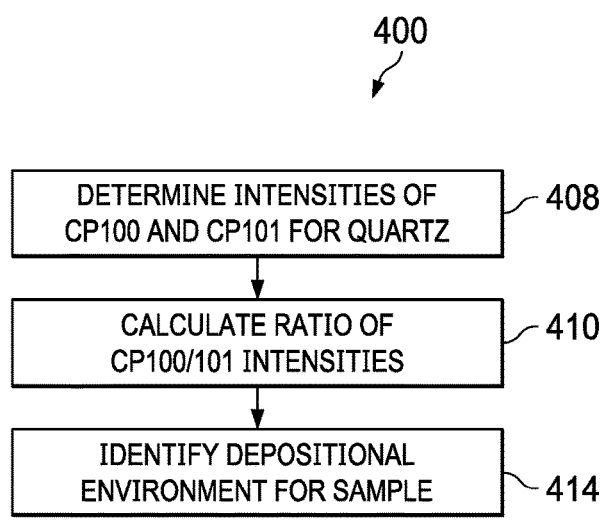

FIGS. 4A and 4B are process flow diagram of a method 400 for determining a depositional environment from the intensity ratio of the CP 100 and 101 scattering peaks for quartz. The method begins at block 402, when a sample the analysis is obtained. The sample may be a thin slice cut from a core taken from an exploratory well, or may be a cuttings sample taken from a drilling operation. In an example, the sample was taken from the same material used for petrographical analysis, allowing calibration to be performed with the same samples.

At block 404, the sample was prepared by grinding using a micronizing mill. In a micronizing mill, the crystal lattice is preserved during the grinding process.

At block 406, the powder is mounted in an x-ray diffraction sample holder. The powder amount was prepared by tamping the loose powder in the slide cavity of the x-ray diffraction sample holder with a razor blade having a sharp edge, in order to minimize preferred orientation.

The same preparation technique of milling and slide preparation, e.g., packing of the sample holder, was used for all samples. For example, the same milling time was used for all samples. This was performed to prevent differences that could be related to the broadening of peaks due to weakening of the crystal lattice by micro strain.

At block 408, the sample holder is inserted in the XRD instrument and a diffractogram is generated. From the diffractogram, the intensities of the CP 100 and CP 101 peaks for quartz are measured. The analysis, the At block 410, the ratio of the CP 100/101 intensity peaks is calculated. The relative intensities utilized are based on the peak heights to compute the ratio to determine depositional environments.

At block 412, the ratio of the CP 100/101 intensity peaks is compared to a calibration determined from petrographic analysis of the depositional environments. As discussed further with respect to FIG. 3, the use of the CP 100/101 intensity ratio to determine depositional environments is based on an assumption that the quartz median grain diameters are related to the energy and provenance of the depositional environment, and that quartz is the dominant mineral composing the matrices of these rocks. The ratio is based on the strongest diffraction peaks associated with quartz. Because peak intensities are utilized, care has been exercised toward ensuring the baselines of the diffraction patterns have not been influenced by the minor mineral constituents and sample preparation. Also, to further evaluate potential preferred orientation, other quartz peak intensities for CP 112 and CP 211 compared to that of CP 100 and CP 101 have also been evaluated. The measurements of the ratios of these peaks may allow for a determination of the effects of sample preparation.

Thin section slides are generally used to determine relative geological description and facies/depositional models in petrography. The subject samples utilized in the techniques described herein were also used in petrography to separately identify the depositional models, along with detailed core description in a sedimentological workflow. The petrography performed on these samples was correlated with the grain size and facies. X-Ray Diffraction was used on the same samples as a separate technique to determine the mineralogical composition of the samples. The XRD patterns providing with crystallographic planes of minerals was used to measure the peak intensities in order to calculate the intensity ratios of the CP 100 and CP 101 peaks of quartz.

In this present work, the depositional environments were identified separately using petrography by means of thin sections along with detailed core description in a sedimentological workflow. X-Ray Diffraction was used on the same samples as a separate technique to determine the mineralogical composition of the samples. The integration of all tools resulted to describe these depositional environments using the relative intensities of the crystallographic planes. Petrography performed on these samples to correlate to the claims made concerning grain size and depositional environment.

At block 414, the depositional environment for the sample is determined from the comparison to the calibration. Results indicate that the ratio of the intensities of the CP 100/101 peaks are changing according to the depositional environments determined by petrography. This is shown further in the results of Table 2. Two different intervals were run for the dune facies. The results for both intervals were similar, and higher than other depositional environments.

TABLE 2 determination of ratios for peak intensities of CP 100 and CP 101 compared to depositional environments.

| Type | Depth (ft.) | 100 CPS | 101 CPS | 100/101 | Mean |
| --- | --- | --- | --- | --- | --- |
| Lake shoreline | 14630.5 | 1522 | 10670 | 0.14 | 0.15 |
| Lake shoreline | 14632.3 | 2185 | 13529 | 0.16 | |

TABLE 2-continued determination of ratios for peak intensities of CP 100 and CP 101 compared to depositional environments.

| Type | Depth (ft.) | 100 CPS | 101 CPS | 100/101 | Mean |
| --- | --- | --- | --- | --- | --- |
| Fluvial | 14497.4 | 2436 | 9996 | 0.24 | 0.23 |
| Fluvial | 14509.4 | 2552 | 11506 | 0.22 | |
| Coastal dune | 14605.5 | 2215 | 7210 | 0.31 | 0.28 |
| Coastal dune | 14608.4 | 2736 | 10522 | 0.26 | |
| Dune (interval 1) | 14192.5 | 2812 | 9433 | 0.30 | 0.34 |
| Dune (interval 1) | 14506.6 | 6121 | 15768 | 0.39 | |
| Dune (interval 2) | 14594.1 | 4176 | 7660 | 0.55 | 0.47 |
| Dune (interval 2) | 14596.6 | 2867 | 7426 | 0.39 | |

The ability of the technique to discern between different depositional environments is described further with respect to the plots of FIGS. 5-10. These plots are diffractograms of powder samples, formed using the sample preparation techniques described with respect to FIG. 4. The milling time was performed in a micronizing mill for about 5 minutes for each sample. A micronizing mill that may be used in the present techniques is the XRT Mill McCrone, available from the McCrone Group, Inc., of Westmont, Ill. The x-ray diffraction was run on Rikagu ULTIMA IV powder X-Ray diffractometer, available from the Rigaku Corporation of Tokyo, Japan. The source was a CuKα emitter (40 kV, 40 mA). The diffraction interval was 3°-70° (2θ), with a step size increment of 0.02°.

FIG. 4B is a simplified process flow diagram of the method 400. Like numbered items are as described with respect to FIG. 4A.

Figure 5:
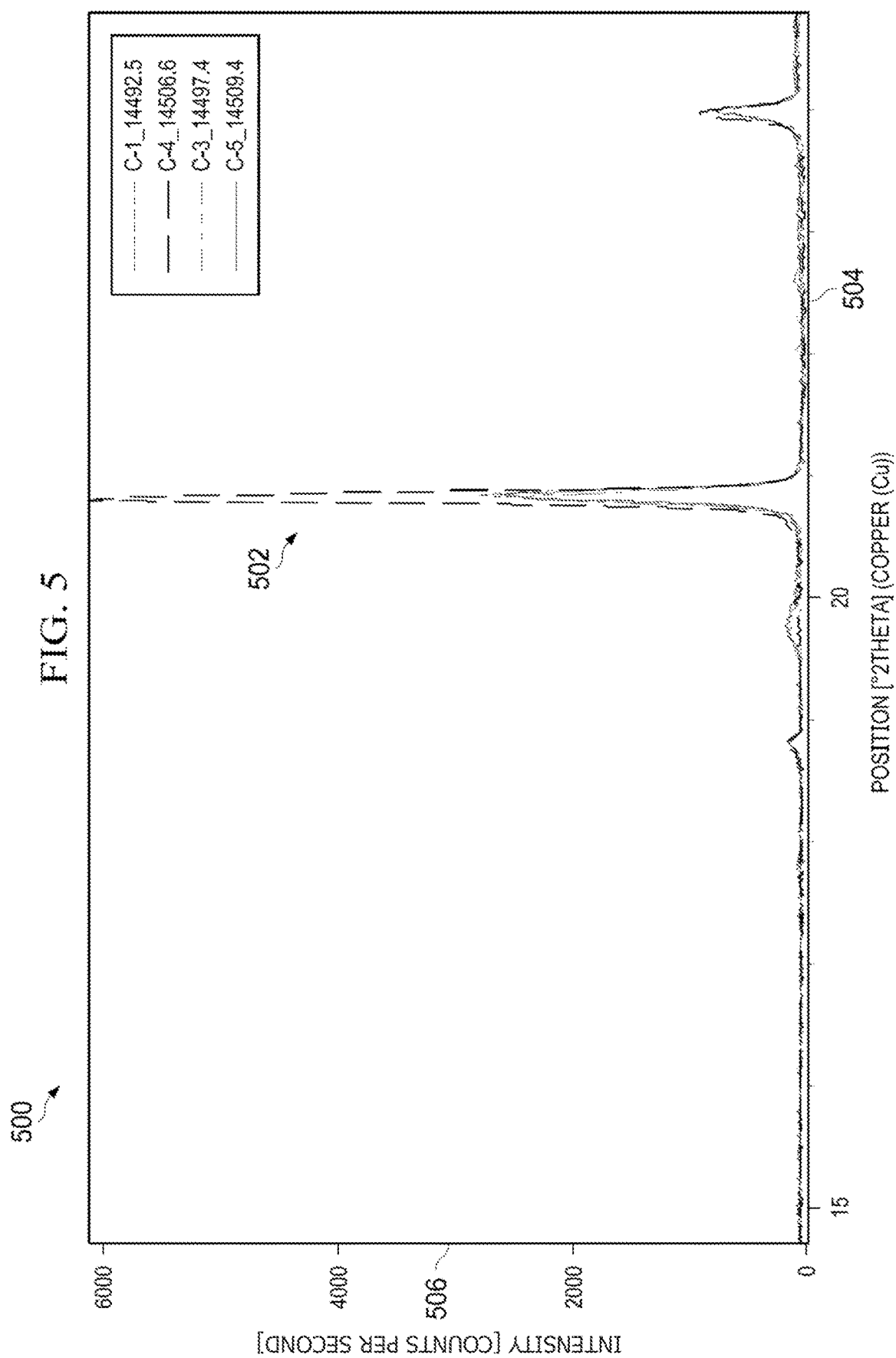
FIG. 5 is a diffractogram of CP 100 peaks of quartz samples from different depositional environments.

FIG. 5 is a diffractogram 500 of CP 100 peaks 502 of quartz samples from different depositional environments. In the diffractogram 500, the x-axis 504 is the position of the x-ray head in degrees 2-theta, and the y-axis 506 is the intensity of the emission in counts per second.

In the diffractogram 500, samples from four depositional environments, C-1: coastal dune, C-4: dune, C-3 and C-5: fluvial, were run. As can be seen from the diffractograms 500, strong differences in intensity levels of the CP 100 peaks 502 for samples from the different depositional environments. This indicates that the intensity levels may be used to identify the depositional environments. Further runs, not shown, were performed to complete the correlation.

Figure 6:
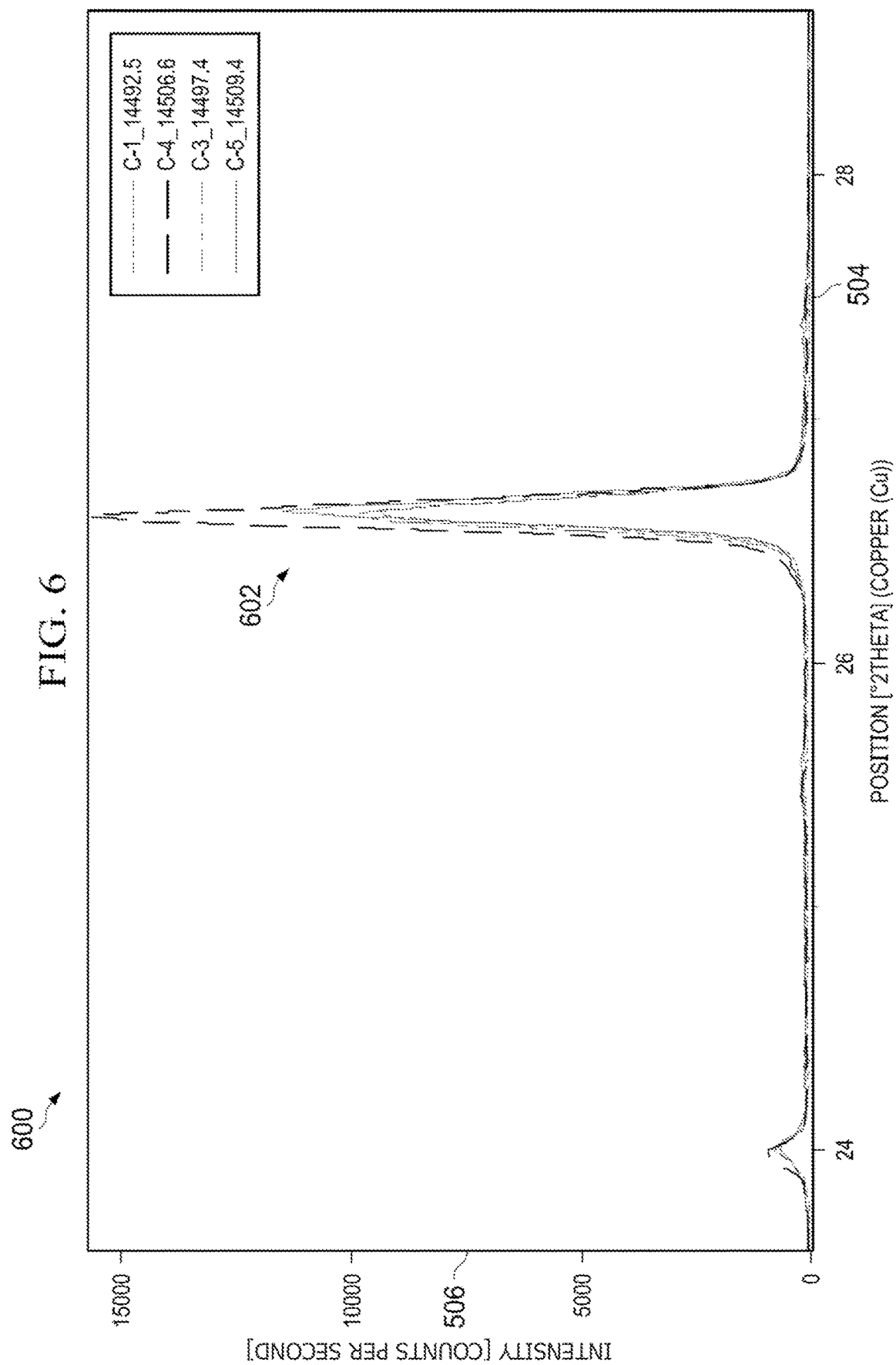
FIG. 6 is a diffractogram of CP 101 peaks of the quartz samples from different depositional environments described with respect to FIG. 5.

FIG. 6 is a diffractogram 600 of CP 101 peaks 602 of the quartz samples from different depositional environments described with respect to FIG. 5. Like numbered items are as described with respect to FIG. 5. As for the CP 100 peaks 502 shown in FIG. 5, the CP 101 peaks 602 of the quartz samples show strong differences in intensity levels. Accordingly, the intensity level for each of the depositional environments, shown as the CP 100 peaks 502 of FIG. 5, was ratioed with the corresponding intensity level for the CP 101 peaks 602 of FIG. 6.

Figure 7:
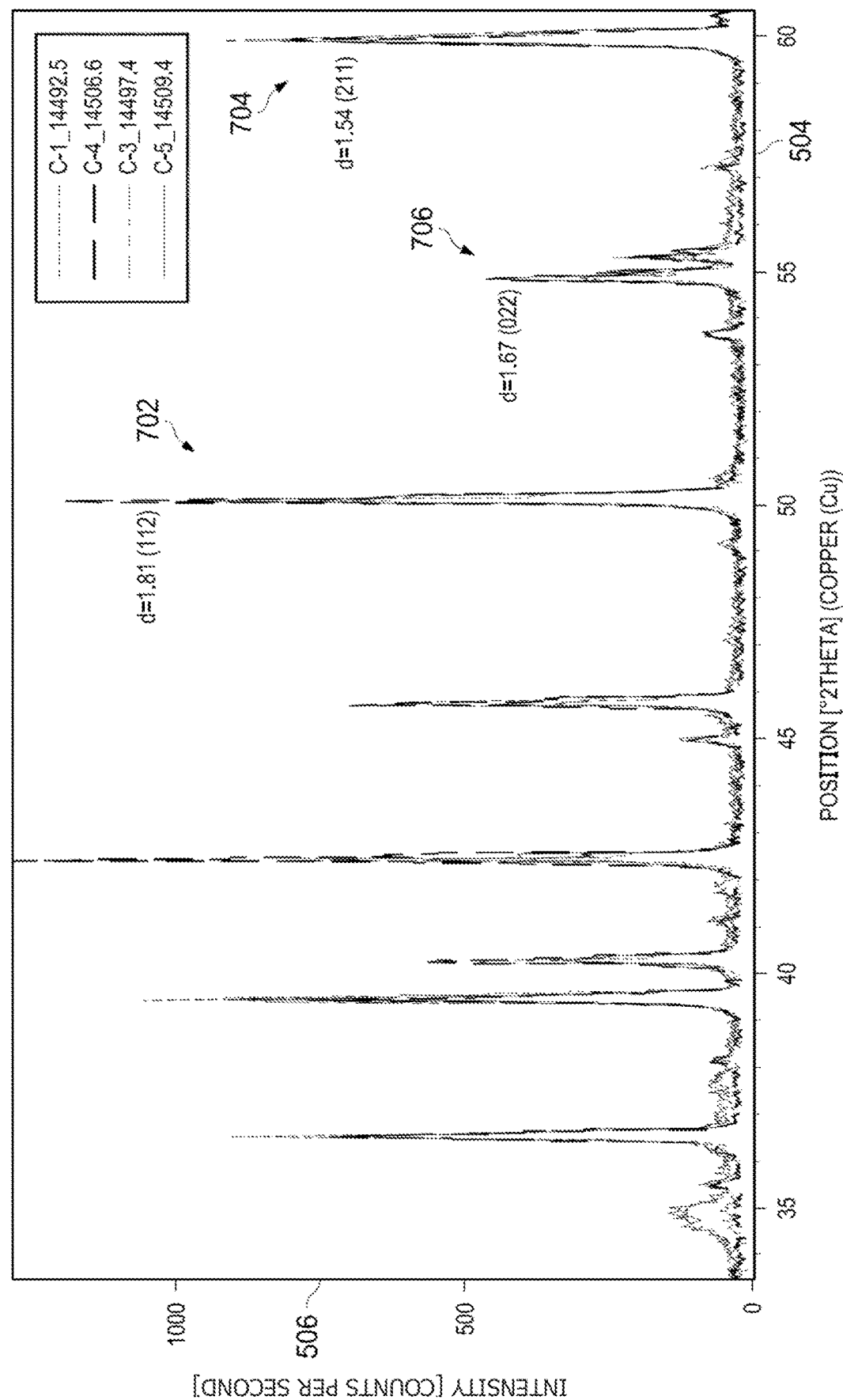
FIG. 7 is a diffractogram showing the intensity levels of other crystallographic planes of quartz for the samples of FIG. 5.

FIG. 7 is a diffractogram 700 showing the intensity levels of other crystallographic planes of quartz for the samples of FIG. 5. These crystallographic planes include the CP 112 (d=1.81 A) peaks 702, CP 211 (d=1.54) peaks 704, and CP 022 (d=1.76) peaks 706.

The CP 112 peaks 702, CP 211 peaks 704, and CP 022 peaks 706 show similar intensity levels. This indicates that intensity at higher angles from the diffraction pattern are not affected by sample preparation.

Figure 8:
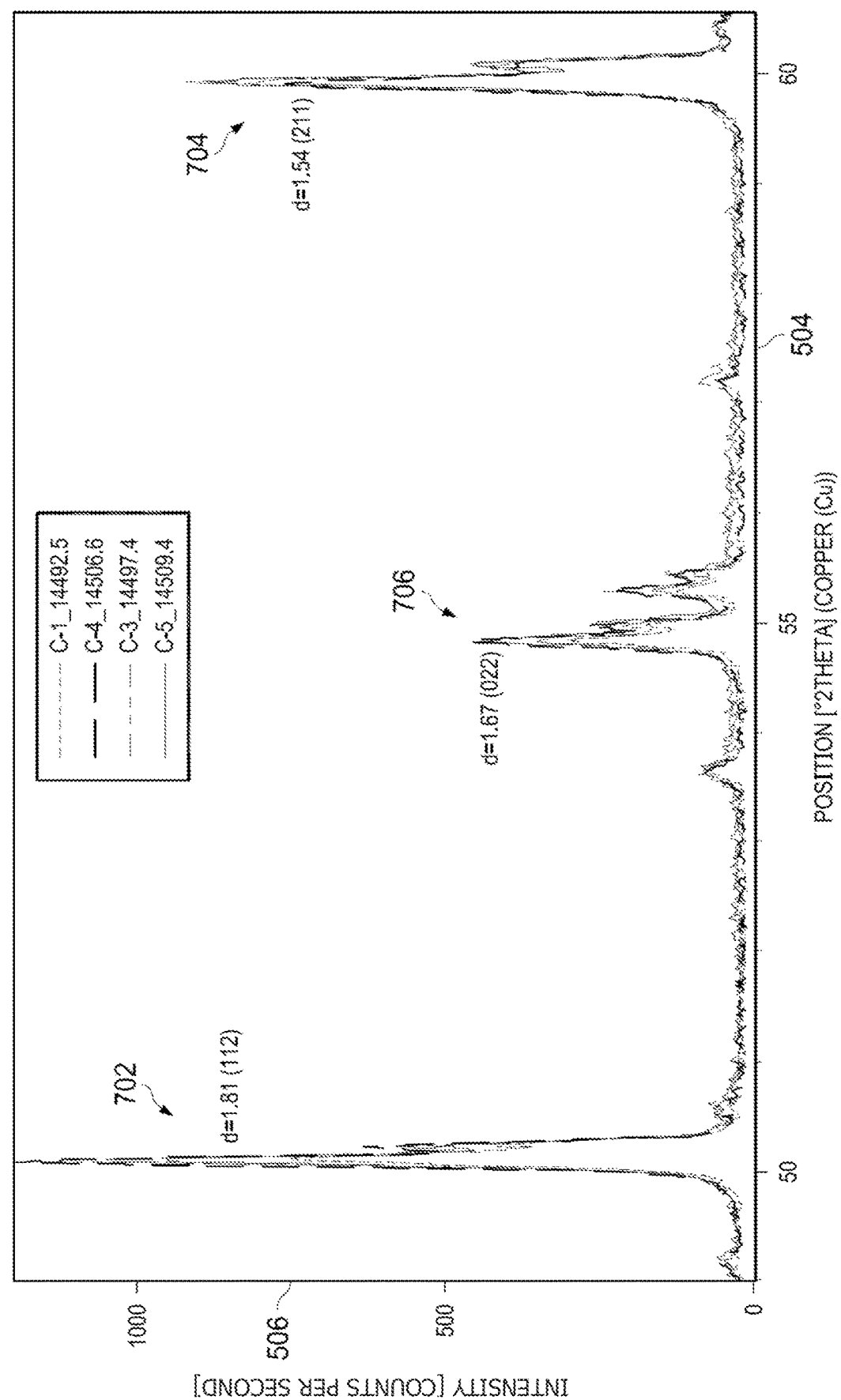
FIG. 8 is a diffractogram showing the intensity levels of other crystallographic planes of quartz for the samples of FIG. 5.

FIG. 8 is a diffractogram 800 showing an expanded view of the peaks of FIG. 7. Like numbered items are as described with respect to FIG. 7. As can be seen in FIG. 8, the expanded view confirms that the intensity levels of these peaks show similar intensities.

As the techniques for determining the depositional environment using the ratio of the intensities of the CP 100 and CP 101 peaks of quartz x-ray are faster than the petrography techniques using thin slices, the number of samples that can be analyzed is substantially increased. For example, the number of samples that can be analyzed by petrography per day, may be about 6 to 10 samples per day. By comparison, the XRD analysis may be performed on 24 to 48 samples per day. Thus, the speed of sample analysis may be improved by at least a factor of 3 the operations in case of urgent exploration procedures.

In an implementation described herein, a method is provided for determining a depositional environment of a sample of a subterranean environment. The method includes measuring intensities for a crystallographic plane (CP) 100 peak and a CP 101 peak for quartz in a diffractogram, calculating a ratio of the intensities of the CP 100 peak to the CP 101 peak, and identifying a depositional environment for the sample from the ratio.

In an implementation, the method includes obtaining the sample from a core sample. In an implementation, the method includes obtaining the sample from cuttings from the drilling process. In an implementation, the method includes micronizing the sample and loading the sample in an x-ray diffraction sample holder.

In an implementation, the method includes comparing peak intensities for other crystallographic planes to measure effects of sample preparation. In an implementation, the method includes comparing peak intensities for CP 112 peaks for samples from different depositional environments to measure effects of sample preparation. In an implementation, the method includes comparing peak intensities for CP 211 peaks for samples from different depositional environments to measure effects of sample preparation.

In an implementation, the method includes correlating intensity ratios to depositional environment by determining the depositional environment for each of a plurality of sample, and measuring the intensity for the CP 100 peak and the CP 101 peak for each of the plurality of samples. The ratio of the intensity of the CP 100 peak to the CP 101 peak for each of the plurality of samples is calculated. The intensity ratio for each of the plurality of samples is correlated to the depositional environment.

In an implementation, the depositional environment for each of the plurality of samples is determined through a petrographic analysis. In an implementation, a plurality of samples obtained from cuttings generated during a well drilling is screened for depositional environment.

In an implementation, a reservoir layer is identified based, at least in part, on the depositional environment of the sample. In an implementation, a reservoir is located based, at least in part, on the depositional environment of the sample. In an implementation, a wellbore is drilled to a reservoir based, at least in part, on the depositional environment of the sample.

In an implementation, the method includes performing a seismic analyses of a potential location for a reservoir. In an implementation, data from the seismic analyses is used to locate a site for drilling an exploratory well to collect core samples.

In another implementation described herein, a method is provided for determining a placement of a well in a reservoir. The method includes obtaining a sample of rock from a facies in a wellbore, grinding the sample to form a powder, and mounting the powder in a sample holder and inserting the sample holder in an x-ray diffraction instrument. An intensity is determined of a peak for a crystallographic plane (CP) 100 of quartz in the sample. An intensity is determined of the peak for a CP 101 of quartz in the sample. A ratio of the intensities for the CP 100 peak and the CP 101 peak is calculated. The ratio is compared to a correlation between ratios and depositional environments. The depositional environment for the sample is identified. The placement of the wellbore in the reservoir is determined, based, at least in part, on the depositional environment.

In an implementation, the method includes drilling an exploratory well to obtain core samples of rock in a subterranean environment. In an implementation, the method includes obtaining the sample of rock from the core sample. In an implementation, the method includes obtaining the sample of rock from cuttings from drilling a wellbore.

In an implementation, the method includes correlating intensity ratios to depositional environment by determining the depositional environment for each of a plurality of samples. The intensity for the CP 100 peak in the CP 101 peak for each of the plurality of samples is determined. The ratio of the intensity of the CP 100 peak to the CP 101 peak is calculated for each of the plurality of samples. The intensity ratio for each of the plurality of samples is correlated to the depositional environment.

In an implementation, the method includes collecting seismic data on a potential reservoir site and determining the placement of the wellbore in the reservoir based, at least in part, on the seismic data.

Other implementations are also within the scope of the following claims.

What is claimed is:

1. A method for determining a depositional environment of a sample of a subterranean environment, comprising:
    micronizing the sample;
    loading the sample in an x-ray diffraction sample holder;
    measuring intensities for a crystallographic plane (CP) 100 peak for quartz and a CP 101 peak for quartz in a diffractogram;
    calculating a ratio of the intensities of the CP 100 peak for quartz to the CP 101 peak for quartz; and
    identifying a depositional environment for the sample from the ratio, wherein a correlation between the depositional environment and the ratio is determined by petrographic analysis.

2. The method of claim 1, further comprising obtaining the sample from a core sample.

3. The method of claim 1, further comprising obtaining the sample from cuttings from a drilling process.

4. The method of claim 1, further comprising comparing peak intensities for other crystallographic planes to measure effects of sample preparation.

5. The method of claim 1, further comprising comparing peak intensities for CP 112 peaks for quartz for samples from different depositional environments to measure effects of sample preparation.

6. The method of claim 1, further comprising comparing peak intensities for CP 211 peaks for quartz for samples from different depositional environments to measure effects of sample preparation.

7. The method of claim 1, further comprising correlating intensity ratios to depositional environment by:
    determining the depositional environment for each of a plurality of samples;
    measuring the intensity for the CP 100 peak for quartz and the CP 101 peak for quartz for each of the plurality of samples;

calculate the ratio of the intensity of the CP 100 peak for quartz to the CP 101 peak for quartz for each of the plurality of samples; and correlate the intensity ratio for each of the plurality of samples to the depositional environment.

8. The method of claim 7, further comprising determining the depositional environment for each of the plurality of samples through a petrographic analysis.

9. The method of claim 1, further comprising screening a plurality of samples obtained from cuttings generated during a well drilling for depositional environment.

10. The method of claim 1, further comprising identifying a reservoir layer based, at least in part, on the depositional environment of the sample.

11. The method of claim 1, further comprising locating a reservoir based, at least in part, on the depositional environment of the sample.

12. The method of claim 1, further comprising drilling a wellbore to a reservoir based, at least in part, on the depositional environment of the sample.

13. The method of claim 1, further comprising performing a seismic analyses of a potential location for a reservoir.

14. The method of claim 13, further comprising using data from the seismic analyses to locate a site for drilling an exploratory well to collect core samples.

15. A method for determining a placement of a well in a reservoir, comprising:
    obtaining a sample of rock from a facies in a wellbore;
    grinding the sample to form a powder;
    mounting the powder in a sample holder and inserting the sample holder in an x-ray diffraction instrument;
    determining an intensity of the peak for a crystallographic plane (CP) 100 of quartz in the sample;
    determining the intensity of the peak for a CP 101 of quartz in the sample;
    calculating a ratio of the intensities for the CP 100 peak for quartz and the CP 101 peak for quartz;
    comparing the ratio to a correlation between ratios and depositional environments;
    identifying the depositional environment for the sample; and
    determining the placement of the wellbore in the reservoir based, at least in part, on the depositional environment.

16. The method of claim 15, further comprising drilling an exploratory well to obtain core samples of rock in a subterranean environment.

17. The method of claim 16, further comprising obtaining the sample of rock from the core sample.

18. The method of claim 15, further comprising obtaining the sample of rock from cuttings from drilling a wellbore.

19. The method of claim 15, further comprising correlating intensity ratios to depositional environment by:
    determining the depositional environment for each of a plurality of samples;
    determining the intensity for the CP 100 peak for quartz and the CP 101 peak for quartz for each of the plurality of samples;
    calculating the ratio of the intensity of the CP 100 peak for quartz to the CP 101 peak for quartz for each of the plurality of samples; and
    correlating the intensity ratio for each of the plurality of samples to the depositional environment.

20. The method of claim 15, further comprising:
    collecting seismic data on a potential reservoir site; and
    determining the placement of the wellbore in the reservoir based, at least in part, on the seismic data.

* * * * *